Patented Feb. 14, 1950

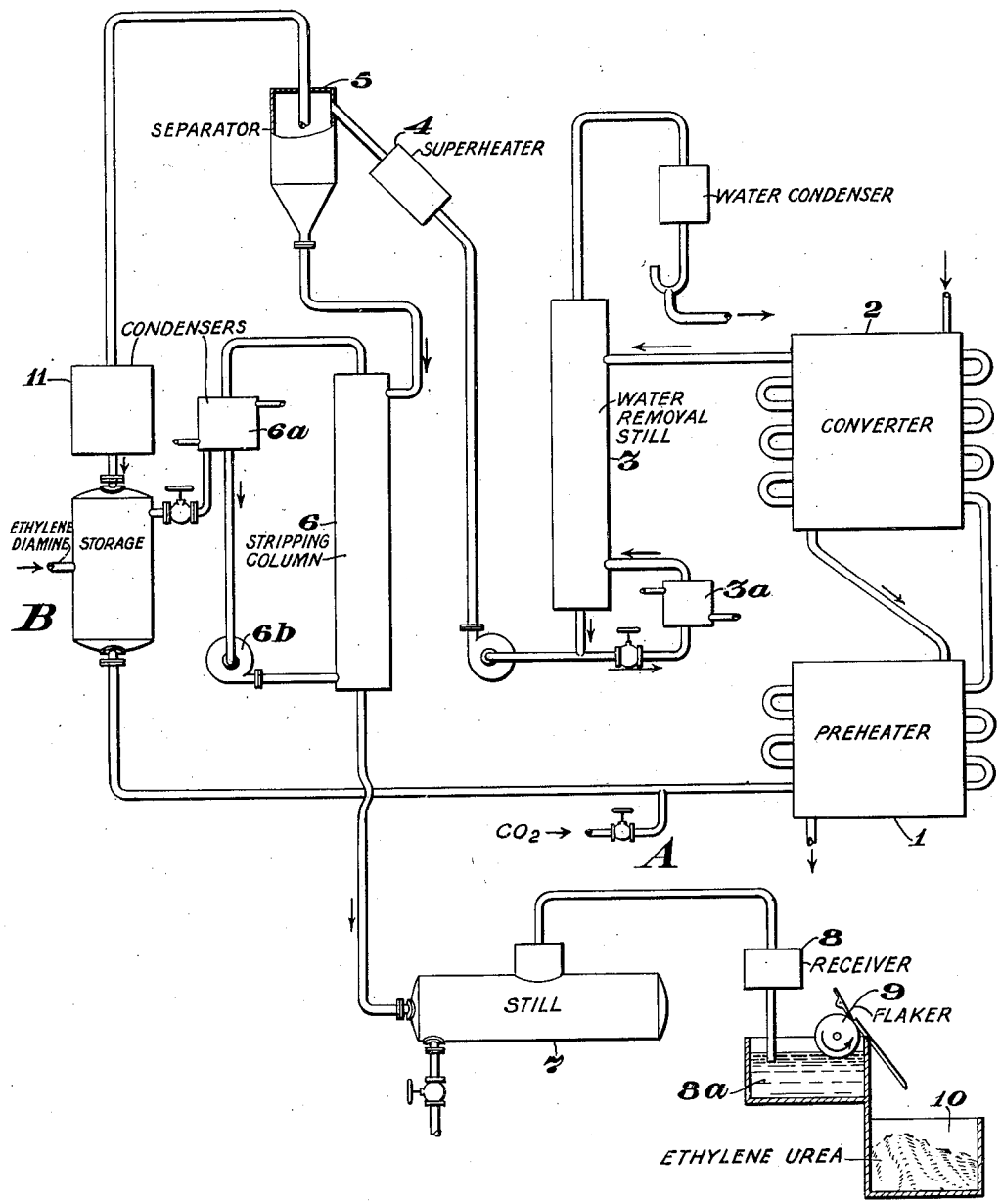

2,497,309

UNITED STATES PATENT OFFICE 2,497,309

PROCESS FOR THE PREPARATION OF ETHYLENEUREA

Alfred T. Larson and Arthur G. Weber, Wilmington, Del., assignors to E. I. du Pont de Nemours & Company, Wilmington, Del., a corporation of Delaware Application May 4, 1944, Serial No. 534,046

11 Claims. (Cl. 260—309)

This invention relates to a process for the preparation of N.N'ethyleneurea, and more particularly to its preparation from ethylenediamine and carbon dioxide. The subject matter of this case is related to the A. T. Larson copending applications S. N. 524,525, which has become abandoned, and S. N. 524,527, filed March 1, 1944.

N.N'ethyleneurea, hereinafter referred to as ethyleneurea, and otherwise known as 2-oxoimidazolidin and imidazolidon (2), has been made by heating ethylenediamine with diethyl carbonate at 180° C. [E. Fisher, Koch, A 232, 227 (1886)], by warming an aqueous solution of N.N'ethylene thiourea with freshly precipitated mercuric oxide [Klut Ar. 240, 677 (1887)], and by distillation of aqueous N.N'ethylene guanidine under diminished pressure [Pierron A 9 (11) 363 (1908)]. Ethyleneurea has remained more or less a laboratory curiosity, however, for the above processes to date have been of only academic significance.

An object of the present invention is to provide an improved process for the preparation of ethyleneurea. Another object of the invention is to provide a process for the preparation of ethyleneurea from ethylenediamine and carbon dioxide. Yet another object is to provide a process for the preparation of ethyleneurea from ethylenediamine, water and carbon dioxide under elevated temperatures. A further object is to provide a continuous process for the preparation of ethyleneurea from mixtures of ethylenediamine and carbon dioxide under elevated temperatures and pressures. Other objects and advantages of the invention will hereinafter appear.

Broadly, the process of the invention may be described as involving the high temperature reaction of ethylenediamine with carbon dioxide. For example, a pressure resisting reaction vessel is continuously charged with anhydrous or aqueous ethylenediamine and carbon dioxide. It has been determined that carbon dioxide reacts with ethylenediamine to first give an ethylenediamine carbamate which may be formed as a solution, slurry or solid according to the proportions of reactants, an excess of the ethylenediamine giving a solution or slurry, while an excess of carbon dioxide produces a solid. If the reaction is conducted rapidly, which is possible if it is carried out continuously, the carbamate appears to have but a transient existence. In any event, by conducting the process continuously and heating to temperatures described below, the conversion of the ethylenediamine to ethyleneurea is assured.

The reaction is conducted at temperatures ranging from about 175° C. to about 300° C. At temperatures approaching 300° C., however, the crude product is somewhat darkened in color, indicating some decomposition, and this may be avoided by conducting the reaction at temperatures somewhat below 300° C., say, for example, below 270° C. but above 175° C. Elevated pressures may be used and may range from 10 or 500 atmospheres or more.

The ratio of ethylenediamine to carbon dioxide may vary over a wide range. For example, the carbon dioxide may be present in excess, thereby giving acid reaction conditions and more or less solid reactants or the ethylenediamine may be present in excess giving a slurry or homogenous solution. Accordingly, there may be present from 0.1 to 15 moles of carbon dioxide per mole of ethylenediamine on a weight basis, although an excess of ethylenediamine is preferably used in the order of about 1.01 to 1.5 moles thereof per mole of carbon dioxide.

The reaction will produce ethyleneurea in the presence or absence of water, but for best results aqueous solutions of ethylenediamine are used. The azeotrope of ethylenediamine and water (84% diamine, 16% water) or other suitable aqueous solutions of ethylenediamine containing from 10 to 50% water appear to be as effective as the anhydrous compound.

The ethyleneurea may be separated from the crude reaction mixture by evaporation, by vacuum distillation or by steam distillation, i. e. by heating the mixture to distillation temperature while passing steam through it. Alternatively, the crude product may be subjected to crystallization for the separation of ethyleneurea, the crystallization being conducted in a suitable solvent therefor.

The process is carried out by passing ethylenediamine, preferably as an aqueous solution, and carbon dioxide continuously into a tubular type reactor. The continuous operation of the process is illustrated by the attached drawing wherein carbon dioxide through pipe A and ethylenediamine from storage tank B are introduced into a silver-lined preheater 1 wherein the reaction mixture is raised to approximately reaction temperature and from this preheater the mixture is introduced into the converter 2 which consists of a silver-lined reaction tube of relatively great length to diameter. In this tube the reaction mixture is maintained at a temperature above 175° C. and a pressure above 10 atmospheres. If carbon dioxide is in excess of the stoichiometric requirements the operating pressure is preferably above 100 atmospheres. The reaction mixture issuing from converter 2 is passed into the water removal column 3, heated by calandria 3a, wherein a major portion of the water is distilled from the unconverted ethylenediamine. The crude reaction mixture is then passed through heater 4 wherein the ethylenediamine is vaporized at a temperature of about 170° C. and the resulting liquid vapor mixture treated in separator 5, the vapors being passed to condenser 11, the liquids to stripping column 6. The separator 5 may be a cyclone separator in which the entering liquid-vapor mixture is introduced tangentially to the inner cylindrical upper wall. The liquid containing ethyleneurea is treated in stripping column 6 to remove the last of the water, $CO_2$ and ethylenediamine by countercurrent scrubbing with ammonia (nitrogen, methane, carbon monoxide, or other inert gas) at a temperature of approximately 170° C. The scrubbing medium passes through the stripping column condenser and separator 6a and pump 6b back to the column 6. The water, ethylendiamine and $CO_2$ are returned to the storage tank B. The stripping column 6 is preferably a packed column. From the bottom of the stripping column 6 the ethyleneurea is dicharged to the ethyleneurea still 7 operated under a vacuum from which it is distilled into the receiver 8 from which it passes directly to the flaker roll 9 which consists of a chromium-plated cylindrical roll cooled to a temperature of approximately 30° C. upon which the ethyleneurea solidifies and is scraped off in a flake-like form into the hopper 10. The ethylenediamine, $CO_2$ and water from cyclone separator 5 is passed to condenser 11, recycled to the system and reintroduced with make-up ethylenediamine and carbon dioxide into the preheater 1.

Alternatively, the process may be carried out by preheating the ethylenediamine and carbon dioxide separately, mixing them only as they are introduced at approximately reaction temperature into the reaction zone. This procedure eliminates the possibility of the formation of large amounts of ethylenediamine carbamate.

In lieu of water as a solvent for the reaction other inert liquids may be used such as the higher boiling alcohols, e. g. propanol, butanol or cyclohexanol; the ethers, e. g. dibutyl ether, dioxane or the cyclic ethers, and such diluent which may or may not give miscible mixtures, e. g. benzene, toluene, etc.

The examples illustrate preferred embodiments of the invention wherein parts are by weight unless otherwise indicated.

*Example 1*

A silver-lined pressure resisting autoclave was charged with 0.5 mole of ethylene diamine, 0.8 mole of water and 5.0 moles of carbon dioxide. The autoclave was placed in a constant temperature bath, raised to a temperature of 250° C. and shaken throughout the reaction to mix thoroughly the reactants. During the reaction, which was continued at temperature for about 60 minutes, a pressure of 860 atmospheres was developed. The autoclave was cooled, its pressure released and the product evaporated to dryness to give about a 70% yield of ethylene diamine to ethyleneurea.

*Example 2*

A silver-lined pressure resisting autoclave was charged with 0.51 mole of ethylene diamine, 0.8 mole of water and 5.0 moles of carbon dioxide. The autoclave was placed in a constant temperature bath, raised to a temperature of 225° C. and shaken throughout the reaction to mix thoroughly the reactants. During the reaction, which was continued at temperature for about 90 minutes, a pressure of 625 atmospheres was developed. The autoclave was cooled, its pressure released and the product evaporated to dryness to give about an 87% yield of ethylene diamine to ethyleneurea.

*Example 3*

A silver-lined pressure resisting autoclave was charged with 0.5 mole of ethylene diamine, 0.8 mole of water and 5.0 moles of carbon dioxide. The autoclave was placed in a constant temperature bath, raised to a temperature of 250° C. and shaken throughout the reaction to mix thoroughly the reactants. During the reaction, which was continued at temperature for about 35 minutes, a pressure of 795 atmospheres was developed. The autoclave was cooled, its pressure released and the product evaporated to dryness to give about an 80% yield of ethylene diamine to ethyleneurea.

*Example 4*

1½ moles of ethylenediamine (containing 32% water) was pumped from the storage tank to a tee where it was mixed with one mole of carbon dioxide and introduced continuously into preheater 1. In preheater 1 the temperature of the mixture was raised to approximately 200° C. and the mixture then passed into converter 2. This converter consisted of a silver-lined tubular reaction zone of $\frac{9}{16}''$ I. D. and 75 feet in length. The reaction was conducted in converter 2 at a pressure of about 70 atmospheres, a temperature of about 250° C. with a time of reaction of from 12 to 15 minues. The product was continuously discharged from the converter into the water removal still 3 in which the water was removed at a temperature of about 212° C. The substantially water-free crude product was then passed through the heater 4 wherein it was heated to a temperature of about 170° C. and into the cyclone separator 5 in which most of the ethylenediamine and water vapors were separated from the ethyleneurea and the semi-purified ethyleneurea discharged into the stripper column 6 wherein the final traces of water and unconverted ethylenediamine were driven off by contact with a countercurrent flow of nitrogen at a temperature of about 170° C. From stripping column 6 the product was dropped into the still 7 maintained at about 20 mm. pressure and a temperature of about 200° C. and the distillate passed into condenser 8, the ethyleneurea was condensed and passed to the receiver 8a and flaker roll 9. The final product upon analysis revealed an ethylenediamine conversion per pass of about 55% with an overall yield of about 88%.

We claim:

1. A continuous cyclical process for the preparation of ethyleneurea which comprises continuously introducing ethylenediamine, containing from 10 to 50% water, and carbon dioxide into a reaction zone, subjecting the resulting mixture therein to a temperature between 200 and 300° C. and a pressure above 10 atmospheres, continuously discharging the products from the reaction zone, separating the ethyleneurea from the water, the unreacted ethylenediamine and carbon dioxide and returning the unreacted ethylenediamine and carbon dioxide, adding more carbon dioxide and the amount of ethylenediamine consumed in the cycle thereto and passing the resulting mixture into the reaction zone.

2. A continuous process for the preparation of ethyleneurea which comprises continuously introducing ethylenediamine containing from 10 to 50% water and carbon dioxide into a reaction zone of relatively great length to diameter, subjecting the resulting mixture therein to a temperature between 200 and 300° C. and a pressure above 10 atmospheres, continuously discharging the products from the reaction zone, separating the ethyleneurea from the unreacted ethylenediamine and carbon dioxide and returning the ethylenediamine and carbon dioxide to the reaction zone.

3. A continuous process for the preparation of ethyleneurea which comprises continuously introducing ethylenediamine, water and carbon dioxide into a reaction zone of relatively great length to diameter, subjecting the resulting mixture therein to a temperature between 200 and 300° C. and a pressure above 10 atmospheres, continuously discharging the products from the reaction zone, separating the ethyleneurea from water, carbon dioxide and the unreacted ethylenediamine and returning the ethylenediamine to the reaction zone.

4. In a continuous process for the preparation of ethyleneurea by subjecting ethylenediamine and carbon dioxide to reaction under pressures above at least 10 atmospheres and a temperature above 170° C. but below the temperature at which ethyleneurea is decomposed, the steps which comprise continuously passing the reaction products into a heating zone from which the products pass as a two phase liquid-vapor mixture and continuously separating the liquid from the vapor.

5. In a continuous process for the preparation of ethyleneurea by subjecting ethylenediamine and carbon dioxide to reaction under pressures above at least 10 atmospheres and a temperature above 170° C. but below the temperature at which ethyleneurea is decomposed, the steps which comprise continuously passing the reaction products into a heating zone from which the products pass as a two phase liquid-vapor mixture, continuously separating the liquid from the vapor, condensing and recycling part of the vapors, subjecting the liquid to a stripping operation for the removal of residual ethylenediamine and water vapor and finally recovering the ethyleneurea.

6. In a continuous process for the preparation of ethyleneurea by subjecting ethylenediamine and carbon dioxide to reaction under pressures above at least 10 atmospheres and a temperature above 170° C. but below the temperature at which ethyleneurea is decomposed, the steps which comprise continuously passing the reaction products into a heating zone from which the products pass, the unconverted ethylenediamine, carbon dioxide and water in the vapor phase and the ethyleneurea in the liquid phase, and cyclonically separating the two phases.

7. In a continuous process for the preparation of ethyleneurea by subjecting ethylenediamine and carbon dioxide to a reaction at a temperature between 170 and 300° C. and under a pressure of at least 10 atmospheres, the steps which comprise subjecting the reaction mixture containing ethyleneurea, unconverted ethylenediamine, carbon dioxide and water to distillation for the removal of a major portion of the water, to a flash vaporization for the removal of a major portion of the unconverted ethylenediamine, to a stripper action with an inert gas to remove by vaporization remaining unreacted ethylenediamine and water and subsequently purifying the ethyleneurea by vacuum distillation.

8. In a continuous process for the preparation of ethyleneurea by subjecting ethylenediamine and carbon dioxide to a reaction under pressures above 10 atmospheres and temperatures between 200 and 300° C. the step which comprises continuously introducing carbon dioxide and ethylenediamine directly into the reaction zone.

9. The process in accord with claim 8 in which the ethylenediamine and water are each separately preheated prior to introducing them into the reaction zone.

10. The process in accord with claim 8 in which the ethylenediamine and water are each separately preheated at 200° C. prior to introducing them into the reaction zone.

11. A process for the preparation of ethyleneurea which comprises subjecting an aqueous solution of ethylenediamine to a reaction with carbon dioxide at a temperature between 175° C. but below the temperature at which ethyleneurea decomposes, under a pressure above 10 atmospheres, the ethylenediamine being present in excess on a molecular weight basis.

ALFRED T. LARSON.
ARTHUR G. WEBER.

REFERENCES CITED

The following references are of record in the file of this patent:

UNITED STATES PATENTS

| Number | Name | Date |
|---|---|---|
| 1,307,570 | Wenkel | June 24, 1919 |
| 1,785,730 | Davis | Dec. 23, 1930 |
| 1,816,087 | Lindner et al. | July 28, 1931 |
| 2,087,325 | Lawrence et al. | July 20, 1937 |
| 2,194,082 | Booth | Mar. 19, 1940 |
| 2,212,847 | Porter | Aug. 27, 1940 |
| 2,276,696 | Olin | Mar. 17, 1942 |

FOREIGN PATENTS

| Number | Country | Date |
|---|---|---|
| 123,138 | Germany | July 30, 1901 |

OTHER REFERENCES

Fischer-Koch, Annalen, vol. 232, p. 227 (1886).
Chem. Abstracts, vol. 32, p. 488.